United States Patent [19]

Sullins et al.

[11] 4,006,359
[45] Feb. 1, 1977

[54] PIPELINE CRAWLER

[75] Inventors: James R. Sullins, Tulsa; Robert E. West, Catoosa, both of Okla.

[73] Assignee: ABS Worldwide Technical Services, Inc., New York, N.Y.

[22] Filed: Oct. 12, 1970

[21] Appl. No.: 79,859

[52] U.S. Cl. .................. 250/358 P; 73/67.5 R; 73/67.8 S; 104/138 R; 104/138 G; 250/491
[51] Int. Cl.² ............... G01N 21/00; G01N 23/00; B61B 13/10
[58] Field of Search ............ 73/67.5 R, 67.8 S; 104/138 R, 138 G; 250/52, 65 R, 358, 491

[56] References Cited
UNITED STATES PATENTS

| | | | |
|---|---|---|---|
| 2,532,536 | 12/1950 | Boucher | 250/65 |
| 3,087,058 | 4/1963 | Aruanctakis et al. | 250/52 |
| 3,492,477 | 1/1970 | Arnesen | 250/65 |

OTHER PUBLICATIONS

"Pipeline Crawler Seeks Defects in Welded Joints" from Materials Evaluation, July, 1968, pp. 44a & 45a.

*Primary Examiner*—James W. Lawrence
*Assistant Examiner*—T. N. Grigsby
*Attorney, Agent, or Firm*—Beveridge, DeGrandi, Kline

[57] ABSTRACT

A crawler is disclosed for traveling through a workpiece such as a pipeline and inspecting the same for defects. The crawler is a completely self-contained, self-propelled and self-operated vehicle adapted to travel through a pipeline, stop at particular locations such as a girth weld between adjoining sections of pipe, inspect the weld, for example by X-raying it and then proceed onto the next location to be inspected.

13 Claims, 8 Drawing Figures

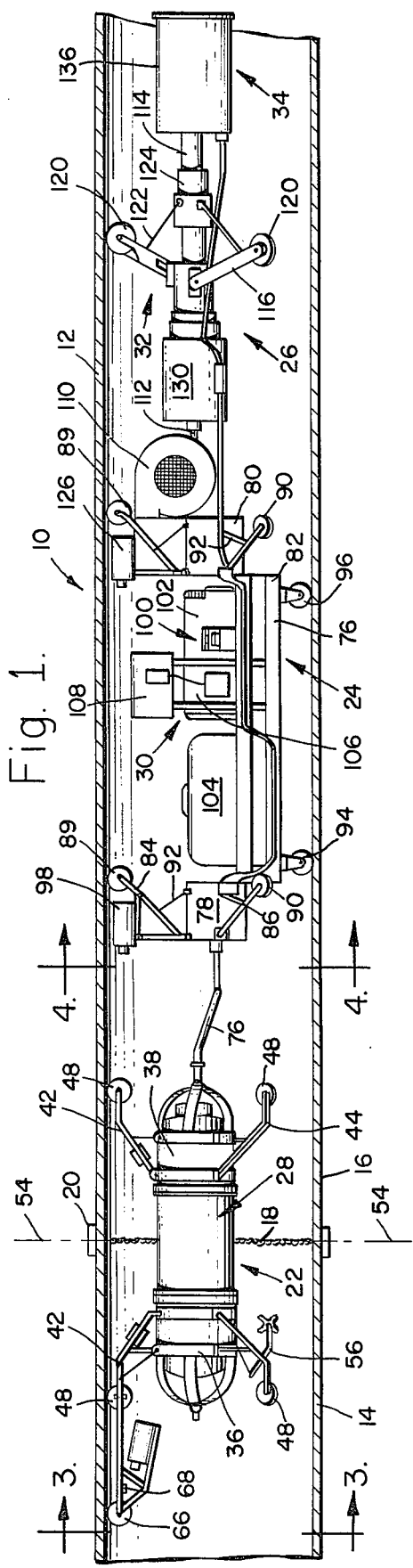
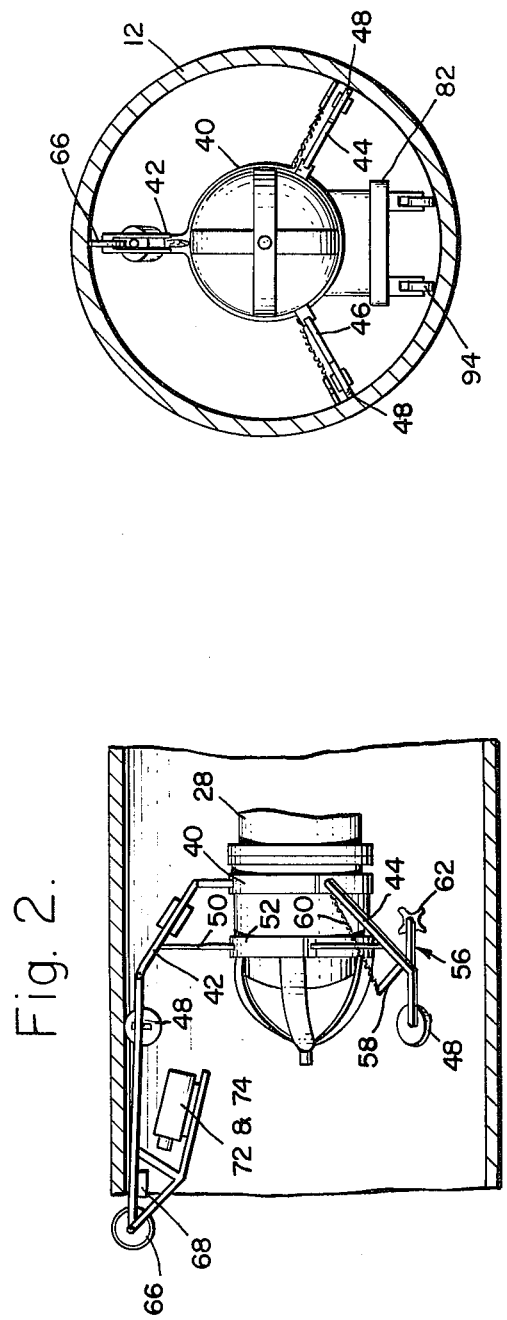
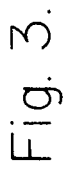
U.S. Patent  Feb. 1, 1977  Sheet 1 of 3  4,006,359
Fig. 1.
Fig. 2.
Fig. 3.
James R. Sullins,
Robert E. West,
INVENTOR.
BY.
ATTORNEY.

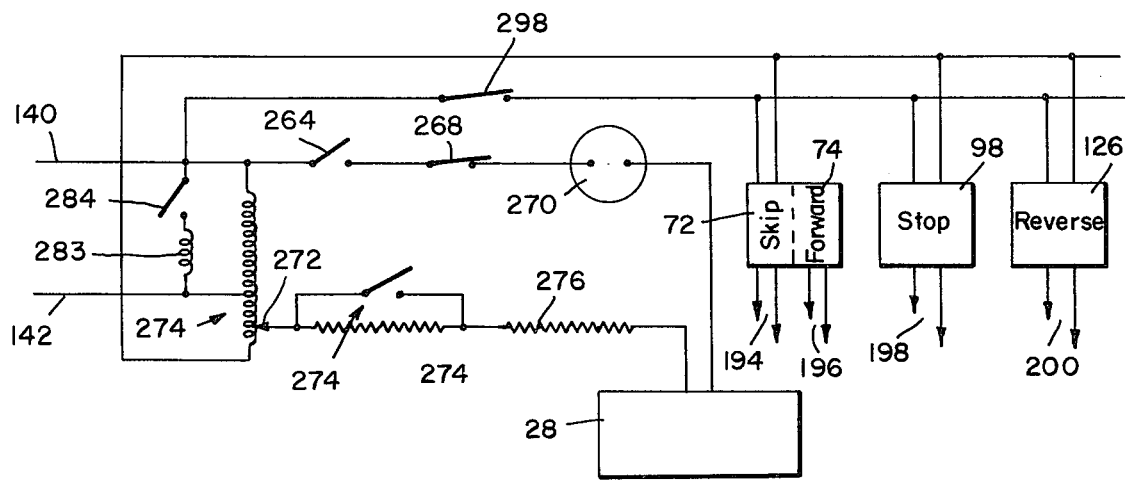
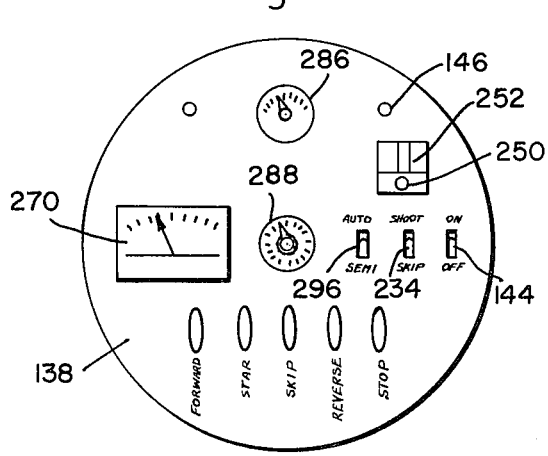
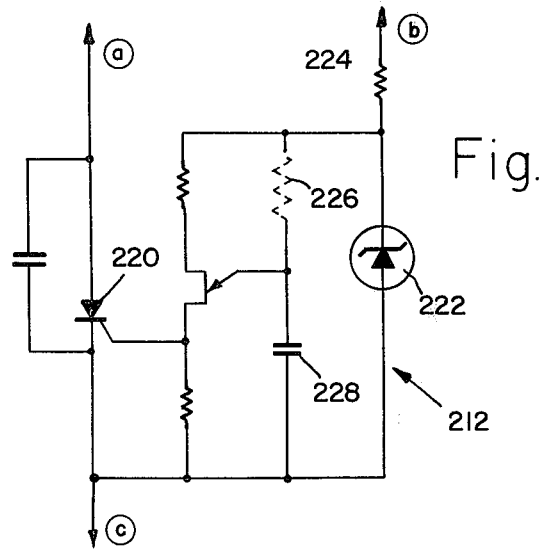
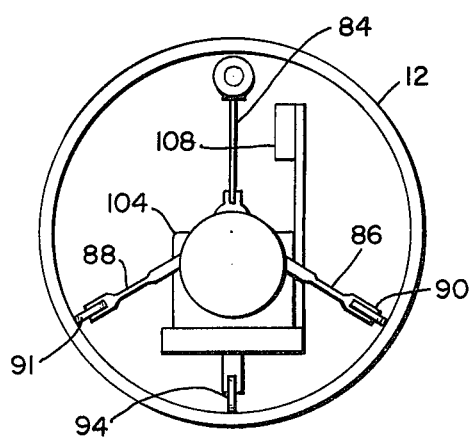

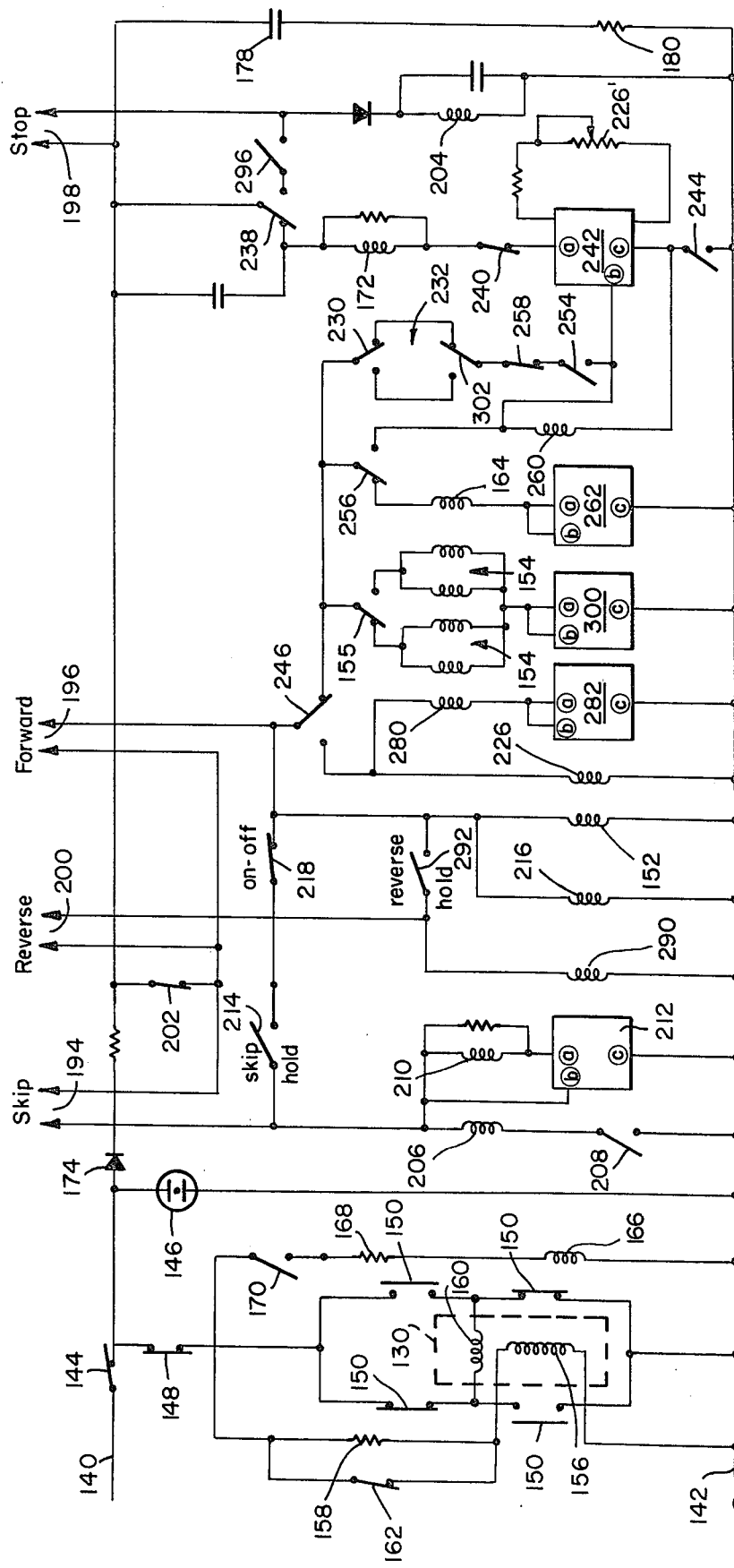

PIPELINE CRAWLER

BACKGROUND

Products such as crude oil, refined petroleum, natural gas, etc., are frequently transported cross-country by pipelines. These pipelines are usually long and have a fairly large diameter. For example, the diameter may be in a range from somewhat less that 20 inches on up to 50 inches or more. In order to increase the rate of flow through the pipelines, it is customary to employ high pressures. To prevent a catastrophic failure, it is essential the pipeline be free of any defects which might result in a weak spot.

A pipeline of this nature is normally built by distributing a series of individual sections of pipe along the pipeline right-of-way. The adjacent ends of the succeeding sections are then welded together to form a continuous pipeline. Following this the finished pipeline is normally buried. It will thus be seen that although the pipeline is continuous and unbroken it has a series of circumferential or girth welds which are spaced at intervals corresponding to the lengths of the original sections. Even though these welds are made in the field under less than ideal conditions, it is essential each one be of a high quality and free from defects such as cracks, inclusions, etc., which might reduce the strength thereof.

At the present time the most reliable means of inspecting welds of this type is to utilize X-rays. The most satisfactory way of X-raying a girth weld is to wrap a belt containing a strip of photographic film around the outside of the pipe so as to cover the weld. The entire weld (i.e., 360°) is then irradiated from the center of the pipe with X-rays. The X-rays penetrate through the weld and expose the film in the belt on the outside of the pipe.

One means of accomplishing this is to utilize an X-ray machine or pipeline crawler such as dislcosed and claimed in U.S. Pat. No. 2,532,536 entitled "Method and Apparatus for Locating Welds in Hollow Metal Bodies;" U.S. Pat. No. 2,547,996 entitled "Portable X-Ray Unit;" and U.S. Patent No. 2,604,521 entitled "Conduit Tractor," all of the aboveidentified patents were filed in the name of Cormack E. Boucher and are assigned of record to Automation Industries, Inc.

A pipeline crawler of this nature travels inside the pipeline, stops at the location of a girth weld, irradiates the weld with X-rays to expose the film and then moves onto the next weld where it again stops and repeats the X-ray operation.

Pipeline crawlers of this nature have been very successful in X-raying the girth welds. However, they have required a remote power source and some form of remote control. As a result they utilized an electrical cable or umbilical cord which they drag through the pipeline. An operator stationed at the end of the pipeline has then controlled the crawler by sending signals over the cable. This has several disadvantages.

It requires an operator with the resultant expenses, etc. In addition, since the operator is located at the end of the pipe, difficulties sometimes occur in locating the weld and stopping the crawler at precisely the location of the weld. Moreover, there are practical limits as to how far the crawler can travel into the pipeline while dragging the cable.

SUMMARY

The present invention provides means for overcoming the foregoing difficulties. More particularly, it provides a crawler which is completely self-contained and does not have any form of umbilical cord. The crawler is effective to sense each of the girth welds as it travels along the pipeline and to stop at only those welds which are to be inspected. The crawler accurately positions itself with respect to the welds to be inspected, irradiates the weld with X-rays and then automatically moves onto the next weld to be inspected.

DRAWINGS

FIG. 1 is a longitudinal, cross-sectional view of a pipeline and a side view of a pipeline crawler embodying one form of the present invention traveling through the pipeline;

FIG. 2 is a cross-sectional view, on a greatly enlarged scale, of a portion of FIG. 1;

FIG. 3 is a transverse, cross-sectional view, on an enlarged scale, taken substantially along the plane of line 3—3 in FIG. 1;

FIG. 4 is a transverse, cross-sectional view, on an enlarged scale, taken substantially along the plane of line 4—4 in FIG. 1;

FIG. 5 is an end view, on an even more greatly enlarged scale, of the end of the pipeline crawler showing the control panel therefor;

FIG. 6 is a diagram of a portion of the control system for controlling the operation of the crawler;

FIG. 7 is a schematic diagram of a timer circuit within the control system in FIG. 6; and FIG. 8 is a diagram of another portion of the control system.

DESCRIPTION

Referring to the drawings in more detail the present invention is particularly adapted to be embodied in a crawler 10 for inspecting a pipeline 12. Although the pipeline 12 may be of any variety, it is normally of the long-distance transmission type for transporting materials such as natural gas, crude oil, refined petroleum products, etc. The pipelines are also normally intended to operate at relatively high pressures.

Pipelines of this nature are normally assembled from a series of individual sections of pipe 14 and 16. The sections 14 and 16 are transported to the pipeline right-of-way and distributed there along. The sections 14 and 16 are then aligned end-to-end. Following this the adjacent ends are welded together to form a continuous pipeline 12. As a result of this procedure the finished pipeline 12 includes a series of circumferential girth welds 18 which extend around the entire pipe.

The individual pipe sections 14 and 16 are usually on the order of thirty to forty feet long, and they are delivered to the right-of-way in this form. However, under some circumstances two sections of the pipe may be joined together by a welding operation performed at a factory or similar facility. The sections delivered to the right-of-way are of double length. As a consequence, every other weld has been made under good conditions and has been inspected prior to its arrival at the right-of-way. Also every other weld is made on-site or in the field, under less than ideal conditions.

For the pipeline 12 to be safe for its intended purpose, it is essential all of the welds 18 be free from any flaws or defects, such as cracks, inclusions, etc., which might tend to in any way weaken the weld. In order to insure the welds 18 being free of defects, the pipeline crawler 10 may be used to inspect the welds. Normally each individual weld 18 is completely inspected. However, under some circumstances it may be acceptable to inspect preselected welds. For example, if the double sections are being used and the factory welds were previously inspected, it is only necessary for the crawler 10 to inspect every other weld.

It has been found the best means for inspecting a girth weld of this variety is to wrap a belt 20 containing photographic film completely around the exterior of the pipeline 12 so as to surround the weld 18. The weld 18 is then irradiated from the inside by gamma rays or X-rays. This forms a photographic image on the film corresponding to the characteristics of the weld 18.

The belt is then removed and the film developed whereby a visual inspection of the weld image may be made. Any cracks, inclusions, etc., can be easily observed upon the photographic film.

The crawler 10, which is best seen in FIG. 1, is adapted to normally travel through the pipeline 12 from right to left. However, it can operate in reverse and travel in the opposite direction. Although the pipeline crawler 10 may be a single, rigid structure, in the present instance it is in the form of an articulated assembly or train.

The present crawler 10 includes three separate units 22, 24 and 26. The first unit 22 inclues an X-ray machine 28 and certain related equipment for irradiating the entire weld 18 with X-rays over 360°. The second unit 24 includes a self-contained power supply 30 for operating all of the equipment on board the crawler 10. The third unit 26 includes a tractor 32 for propelling the entire crawler 10 through the pipeline 12. In addition, the third unit 26 may include a control system 34 for automatically controlling the operation of the crawler 10 and the various functions it performs.

The first unit 22 may be substantially identical to that shown in the above-mentioned U.S. Pat. No. 2,532,536. This unit 22 includes an elongated cylindrical housing 28 containing the X-ray tube, etc. The housing 28 normally has an outside diameter that is considerably less than the inside diameter of the pipeline 12, for example, it may be on the order of about one-fourth to one-half of the diameter of the pipeline 12. A front support assembly 36 and a rear support assembly 38 are secured to the opposite ends of the housing 28 for carrying the first unit 22 through the pipeline 12.

Each of the support assemblies 36 and 38 includes a band or clamp 40 that fits around the housing 28 so as to be securely fastened thereto. Three separate arms 42, 44 and 46 are pivotally secured to each of the bands 40 whereby they are free to swing radially outwardly. Preferably one arm 42 is positioned to extend straight up while the other two arms 44 and 46 extend downwardly and outwardly at about 120° to each other.

A freely turning wheel 48 is provided on the end of each arm 42, 44 and 46 for rolling along the inside of the pipeline 12. Spring links 50 or similar means may be attached between a second band or clamp 52 and each arm 42, 44 and 46. These are arranged to resiliently bias all of the arms 42, 44 and 46 outwardly to maintain the wheels 48 in engagement with the inside surface of the pipeline 12 at all times. It can also be seen this arrangement will keep the housing 28 substantially centered and axially aligned with the pipeline 12 as it travels therethrough irrespective of the diameter of the pipe.

A source of radiation is provided inside the housing 28. This source may be a radioactive isotope or similar source for radiating gamma rays, etc. However, it has been found preferable to employ an X-ray tube. This permits a greater flexibility in controlling the amount of radiation and the energy level. Accordingly, the exposure may be easily and closely matched up to the nature of the pipeline 12 and the weld 18 being inspected.

In the present instance an X-ray tube and the associate equipment are disposed inside the housing 28. The X-ray tube includes an annode which is disposed substantially concentric with the housing 28 and is effective to radiate the X-rays in a plane 54 substantially normal to the axis of the housing 28. It is also preferably effective to radiate the X-rays substantially uniformly over a full circle, i.e., over an arc of 360°. This will insure the entire weld 18 being simultaneously irradiated with X-rays.

For reasons which will become apparent subsequently, a "feeler" 56 may be provided on each of the two front lower arms 44 and 46. In the present instance each of the "feelers" 56 includes a lever 58 pivotally attached to a lower arm 44 or 46. The lever 58 is biased outwardly by a spring 60.

A "star wheel" 62 is rotatably mounted on the end of the lever 58. The wheel 62 includes several sharp edges (for example four) separated by cusps. The sharp edges are arranged to slide along the surface of the pipeline 12 without rotating. However, when one of the sharp reaches a girth weld 18, it strikes the material from the weld and catches thereon. As the crawler 10 continues to advance, the wheel 48 will roll over the weld 18 and then commence sliding again.

A small switch 254 is connected to each of the "star wheels" 62. When the "star wheel" 62 is sliding on the surface and in the position shown, the switch 254 will remain OPEN. However, whenever the wheel 62 catches on a weld 18 and rotates, the switch 254 will be momentarily CLOSED. Thus each time a star wheel 62 passes over the weld 18, a signal will occur. Although only one star wheel 62 may be used, it has been found that on some welds there may not be an internal projection at the precise point scanned by the star wheel 62. By using two star wheels and two switches 254 in parallel, one or the other or both switches 254 will be CLOSED.

A second arm 64 may be pivotally attached to the front band 40. As best seen in FIG. 2 this arm 64 projects alongside of the wheel 48 and extends forward beyond the front of the unit 22. It is, therefore, the leading point on the crawler 10 when it is traveling forward. A wheel 66 on the end of this arm 64 rolls along the inside of the pipeline 12 as the crawler 10 advances through the pipeline 12.

A switch 68 may be mounted on the arm 64 behind the wheel 66. Although a spring is effective to resiliently bias the arm outwardly. Its motion is limited by the wheel 66 rolling along the pipeline 12. When the crawler 10 approaches the end of the pipeline 12, the wheel 66 will be the first thing to emerge from the pipeline 12 and the arm 64 will be forced outwardly by the spring. The arm 64 will then strike the edge of the pipeline 12 and start to slide there along.

However, since the switch 68 is mounted just behind the wheel 66, it will immediately strike the pipe. When this occurs the switch 68 will CLOSE. As explained subsequently this will stop the crawler 10 from advancing. Thus, it will automatically stop at the end of the pipeline 12 and will not continue to travel right out of the pipeline 12.

One or more additional pickups 72 and 74 may be mounted on the arm 64 in spaced relation to the inside surface of the pipeline 12. The nature and operation of these pickups 72 and 74 will be explained in more detail in connection with the operation of the control system 34. However, it will suffice to say at this point the pickups 72 and 74 are preferably of any variety suitable for sensing a "marker" placed on the outside of the pipeline 12 by the operator.

The second unit 24 which is adapted to travel immediately behind the first unit 22 provides the power for running all of the various components on the crawler 10. The first and second units 22 and 24 are connected together by a linkage 76 effective to operate in either compression or in tension. Preferably it includes one or more joints for allowing the two units to "bend" relative to each other as the crawler 10 travels around a bend in the pipeline 12. However, the linkage 76 should prevent the two units rotating relative to each other.

The second unit 24 includes a chassis 76 for carrying the various parts of the power supply 30. The chassis 76 includes a bracket or support 78 and 80 on each end and a platform or tray 82 which is suspended between the two end supports 78 and 80. For reasons which will become apparent subsequently this tray 82 is preferably low to provide a low center of gravity for the second unit.

A first set of arms 84, 86 and 88 is pivotally mounted on the forward support 78 while a second set of arms 84, 86 and 88 is pivotally mounted on the rear support 80. There are separate wheels 89, 90 and 91 mounted on the outer end of each arm 84, 86 and 88 for rolling along the inside surface of the pipeline 12.

Although there may be any desired number of arms in each set, in the present instance there are three arms 84, 86 and 88 and wheels 89, 90 and 91 at each end of the unit 24. These are substantially uniformly spaced at approximately 120° from each other similar to the first unit 22.

If desired all of these arms may be resiliently biased radially outwardly whereby the wheels 89, 90 and 91 will always be maintained tightly against the pipeline 12. However, in this particular embodiment the arms are retained in more or less fixed positions by means of the struts 92. The lengths of the struts 92 are adjusted before the crawler 10 enters the pipeline 12. The circle defined by the wheels 89, 90 and 91 is somewhat smaller than the inside surface of the pipeline 12.

In addition to the two sets of arms and wheels, a caster 94 and 96 may be provided at each end of the tray 82. Each caster 94 and 96 includes a wheel adapted to travel along the bottom of the pipeline 12 and carry the weight of the unit 22. These casters 94 and 96 are preferably substantially on the centerline of the unit 22.

The two lower wheels 90 and 91 are usually adjusted so as to be spaced from the pipeline when the second unit 24 is perfectly vertical and carried by the casters. This spacing may be on the order of about ¼ to ½ inch. The unit 24 seldom if ever remains in a truly vertical position for any extended time. Instead it will normally tilt one way or the other whereby one of the side wheels 90 or 91 rests on the inside of the pipeline 12. As a consequence, the weight of the second unit 24 is carried primarily by the casters 94 and 96 and partially by one of the side wheels 90 or 91.

A cross-country transmission pipeline 12 frequently travels up and down hills and around bends, etc. Under some circumstances this may cause the crawler 10 and/or the units 22, 24 and 26 to travel spirally within the pipeline 12 whereby it would turn upside down. By maintaining the center of gravity for the second unit 24 very low, the crawler 10 will normally remain substantially upright. However, if the crawler 10 still tends to capsize the two lower wheels 90 and 91 may be "cocked" outwardly.

When the unit 24 rolls to one side, it will ride on the casters 94 and 96 and the lower wheels 90 or 91. If these wheels 90 and 91 are "cocked" in the right directions, the wheels 90 and 91 will tend to climb up the wall of the pipeline 12 and restore the crawler 10 to the vertical position.

As the crawler 10 passes through the upright position and tilts into the other direction, it will roll over and rest on the other wheel. Since this wheel is cocked in the opposite direction, the crawler 10 will again be biased toward the upright position. Thus as the crawler 10 travels through the pipeline 12, it will slowly roll a few degrees right and left but remain in a substantially vertical position at all times.

A pickup or sensor 98 similar to the first one 72 and 74 may be mounted adjacent one of the vertical arms 84. This pickup 98 is also effective to sense a marker placed on the outside of the pipeline 12 by the operator.

The various components of the power supply 30 and related equipment are mounted on the second unit 24. The power supply 30 includes a source of electricity. Although storage batteries may be used, it has been found preferable to utilize an essentially conventional motor-generator set 100. This permits a greater amount of power to be available and to allow the crawler to operate over much greater distances. The motor-generator set may include a suitable internal combustion engine such as a two-cycle, gasoline engine 102. It has been found it may usually have a power rate in a range of approximately five or ten H.P. A conventional gasoline tank 104 is mounted on the platform and coupled to the motor 102 by a flexible fuel line or hose.

The electrical generator 106 is coupled directly to the gasoline motor 102. It is adapted to produce electrical power (i.e., AC, DC, etc.) suitable for use with the remaining portion of the system. A junction box 108 is mounted on the frame immediately adjacent the generator 106. This junction box 108 includes suitable circuit breakers, switches, bus bars, etc., for distributing the electric power to the appropriate parts of the crawler 10.

A blower or pair of blowers 110 may be mounted on one of the end supports 78 and 80. The blowers 110 are electrically coupled to the junction box 108. When the blowers 110 are turned ON and operating, they are effective to direct a stream of fresh air across the motor 102 and the generator 106. This is effective to insure an adequate supply of fresh air for the gasoline motor 102 to operate, even though the crawler 10 may remain stopped or parked for a long period of time. It will also keep the motor 102 and generator 106 cool, prevent vapor lock, etc.

The third unit 26 which is adapted to travel immediately behind the second unit 24 is effective to provide the traction for propelling the entire crawler 10 through the pipeline 12. The third unit 26 is connected to the second unit by a linkage 112. This linkage 112 preferably has at least one joint to allow the crawler 10 to travel around bends in the pipeline. However, it preferably prevents relative rotation between the second and third units.

The third unit 26 includes a frame 114 for carrying the various parts thereof. Although any suitable type of frame may be employed, in the present instance the frame is in the form of a large tube or pipe. This frame 114 is adapted to be maintained substantially concentric with the pipeline 12 as the crawler 10 travels there through.

A set of arms 116 is pivotally mounted on a support 118 carried on the frame 114. A traction wheel 120 is mounted on the outer end of each arm 116 for engaging the inside of the pipeline 12. The arms 116 are hinged to swing radially in and out. A strut 122 extends diagonally between the outer ends of the arms 116 and a sleeve 124 slidably mounted on the frame 114. This sleeve 124 is biased axially toward the first support whereby the arms 116 are biased radially outwardly. This arrangement is effective to maintain the three wheels 120 in firm, solid engagement with the interior surface of the pipeline 12. It will also maintain all three wheels 120 at the same radial distance whereby the third unit 26 is axially aligned and centered with respect to the pipeline 12.

A pickup or sensor 126 may be mounted on the top of a vertical bracket 128 so as to be positioned just beneath the top of the pipeline. This pickup 126 may be similar to the preceding sensors 72, 74 and 98 for sensing a marker positioned on the outside of the pipeline 12.

An electric motor 130 is mounted on the end of the frame 114 immediately adjacent the support. The output or drive shaft of the electric motor 130 is coupled to a drive unit or transmission. This is in turn coupled to each of the wheels 120 by means of a chain drive extending along the arm 116. It will thus be seen that when the motor 130 is running, it will apply a torque to the wheels 120 and the entire crawler 10 will be driven axially of the pipeline 12.

The operation of the crawler 10 and the various components thereon (i.e., the motor-generator, electric motor, X-ray tube, etc.) are all automatically controlled by a control system 134. The present control system 134 which is shown in FIGS. 6, 7 and 8 is enclosed within a housing 136 mounted on the end of the tubular frame 114.

The housing 136 may be a large tube or cylinder which is welded onto the rear of the frame 114. The rear end of this housing 136 is open but a control panel 138 (see FIG. 5) may be removably secured to the housing 136 to seal its contents. The various switches, dials, etc., for setting the mode of operation are mounted on the panel 138.

Normally, when a pipeline 12 is to be inspected, the first unit 22 of the crawler 10 is placed in one end of the pipeline 12. Following this, the second and third units 24 and 26 are forced into the pipeline 12 until the drive wheels 120 are just inside the pipeline 12. If the crawler 10 is stopped at about this point, the rearwardly-facing control panel 138 will still be readily accessible to an operator standing outside of the pipe. Accordingly, the operator may set the various switches, dials, etc., to provide the desired mode of operation as the crawler 10 progresses through the pipeline 12.

After the control system 134 has been properly adjusted and when it is desired to commence the inspection, the operator merely starts the crawler 10 and allows it to progress through the pipeline, X-raying the desired girth welds 18 until it emerges from the opposite end of the pipeline 12.

The control system 134 is best seen in FIGS. 6, 7 and 8. The output from the generator 106 is applied across the inputs 140–142 (FIG. 6). At the same time the voltage is normally reduced down to a suitable level and rectified.

A master ON–OFF switch 144 mounted on the control panel 138 is provided in one of the input lines 140. An indicator lamp 146 is mounted on the control panel 138 adjacent the switch 144. This lamp 146 is connected to the master switch 144 whereby the operator will know when the electrical power is applied to the control system 134.

Even though this switch 144 is OPEN, the gasoline engine 102 and the generator 106 may continue to operate. However, the electric drive motor 130 and all of the other controls are effectively isolated from any electrical power.

The electric motor 130 for driving the crawler 10 is electrically coupled between the two input lines 140–142 by a run switch 148 and by a forward-reverse switch 150. The run switch 148 is controlled by the run-relay coil 152, and the forward-reverse switch 150 is controlled by the forward and reverse relay coils 154.

The field winding 156 of the motor 130 is in series with a current-limiting resistor 158 and is parallel to the armature 160. A speed-control switch 162 may be disposed in parallel to the resistance 158. The operation of this switch 162 is controlled by the relay coil 164. When the switch 162 is CLOSED the resistance 158 is shorted out and effectively removed from the field 156. Since this increases the field current, the motor 130 will run at a slow speed and have a high torque suitable for starting. When the switch 162 is OPEN, the field current is decreased and the motor 130 runs at a high rate of speed.

A friction brake may be provided on the drive shaft of the motor 130. When this brake is released the motor 130 and crawler are free to move. However, when the brake is applied, the motor 130 and crawler 10 are locked in a fixed position. The brake is controlled by a relay winding 166 connected to the run switch 148 by a current-limiting resistor 168 and a switch 170. This switch 170 is normally OPEN but is controlled by an X-ray/crawl relay winding 172.

A diode 174, resistor 176, condensor 178 and resistor 180 may be connected between the master switch 144 and the opposite side of the control circuit. These are effective to form a filter circuit for eliminating transients in the current flow. They will also tend to stabilize the voltage present in the control circuit 134.

As previously stated, there are several pickup or sensors 72, 74, 98 and 126 mounted on the crawler 10 at various locations. These sensors 72 may be of any variety suitable for detecting the presence of a marker positioned on the outside of the pipeline 12.

Although various forms of ultrasonic devices and other types of transducers may be employed, in the present instance the sensors include some form of radiation detector such as a Greger-Mueller tube. Each of the sensors is connected between the power lines 182 and 184 (FIG. 7) so as to be operated thereby.

The skip detector 72, the forward detector 74, the stop detector 98 and the reverse detector 126 include separate switches which are connected respectively to the pairs of conductors 194, 196, 198 and 200. These switches are normally OPEN whereby the conductors in the pairs 194, 196, 198 and 200 are not electrically connected together. However, if the operator places a marker such as a radioactive isotope on the top of the pipeline 12 and one of the sensors 72, 74, 98 and 126 passes thereunder, the associated switch will be closed and the conductors in the corresponding pairs 194, 196, 198 and 200 will be connected together. One of the conductors in each of the pairs 194, 196 and 200 is connected to a stop switch 202 on the output side of the resistor 176. The operation of this stop switch 202 is controlled by a stop-relay coil 204. One of the conductors in the pair 198 is connected to the resistor 176.

The second connector in the skip pair of conductors 194 is connected to a skip-hold-relay coil 206 and a deactivate-skipswitch 208. It is also connected to the deactivate-skip-relay coil 210 and a time-delay circuit 212. When the relay coil 206 is energized, it retains the skip-hold switch 214 in the CLOSED position. When a current is flowing through the coil 210 and the time-delay circuit 212, the deactivate-skip switch 208 remains CLOSED. However, when the time-delay circuit 212 stops conducting, the deactivate-relay coil 210 releases the deactivate-skip switch 208 whereby the skip-hold switch 214 OPENS.

The second connector in the forward pair of conductors 196 is connected in series with the run-relay coil 152 which controls the run switch 148. It is also connected to a relay coil 216 which acts as a hold for an ON-OFF switch 218 which is in parallel with the switch in the forward detector 74. As a consequence, when the conductors in the pair 196 are interconnected, the ON-OFF switch 218 and the run switch 148 are both held CLOSED.

The time-delay circuit 212 is best seen in FIG. 7. This time-delay circuit 212 is substantially identical to the time-delay circuits 242, 262, 282 and 300. It includes a transistor 220 which is connected between the terminals $a$ and $c$. This transistor 220 acts as a switch for turning the current flow ON or OFF. A zener diode 222 and voltage dropping resistor 224 extend from terminal $b$ to terminal $c$. An RC circuit having a resistor 226 and a condenser 228 is disposed across the Zener diode 222.

When the skip-hold switch 214 CLOSES, a current flows through the resistor 224 and Zener diode 222. This provides a precisely controlled voltage to be applied across the resistor 226 and condenser 228 forming the RC circuit. As the condenser 228 charges, the voltage on the emitter of the transistor 220 rises until it becomes nonconductive.

When this occurs the deactivate-skip-relay coil 210 will be de-energized whereby the deactivate switch 208 will OPEN. This will cut-off the current flow through the skip-hold relay 206 whereby the skip-hold switch 214 will OPEN.

A double-throw switch 230 in the skip-weld circuit 232 is also controlled by the skip-hold relay 206. When the relay 206 is de-energized, the switch 230 will return to the position shown. The skip-weld circuit 232 includes the double-throw switch 230 and the skip-shoot switch 234. The skip-shoot switch 234 is mounted on the control panel 138 for manual actuation by the operator.

The time delay provided by this circuit may be of any desired duration by selecting the correct combination of resistor 226 and condenser 228. The delay provided by circuit 212 is normally somewhat longer than the time required for the crawler 10 to travel a distance in excess of its own length.

The X-ray-crawl-relay coil 172 is connected in series with a timer swtich 238, a stop switch 240, terminals $a$ and $c$ of an adjustable timer 242 and a reverse-hold switch 244. When the relay coil 172 is de-energized, the X-ray-crawl switch 246 moves to the X-ray position (i.e., opposite to that shown). The forward-reverse switches 150 OPEN, the motor 130 stops, the switch 170 closes to energize the brake relay 166 and the X-ray-ON relay 248 is energized.

The timer circuit 242 is substantially identical to timer 212 shown in FIG. 7. However, the resistance 226' is in the form of a multi-turn, precision potentiometer. The knob 250 mounted on the control panel 138 controls the value of the resistance 226'. This value of the resistance is indicated by a three digit display 252.

The setting of the resistance determines the period of time required for the condenser to charge to a level where the relay coil 172 is de-energized so as to OPEN switch 150 and stop the motor 130. The digits are normally calibrated in tenths of a foot and represent the distance the crawler 10 will travel (at the reduced speed with the switch 162 closed) during the charging interval before coming to a stop. The distance indicated by the digits 252 is normally set to correspond to the space between the star wheel 62 and the plane 54.

The control input $b$ on the timer 242 is connected to the switches 254 on the star wheels 62 and a star-hold switch 256. The star-wheel switches 254 are connected to skip-weld circuit 232 by a circuit-breaker switch 258. Thus, if one or both of the star wheels 62 trip over a weld, it energizes the star-hold relay 260 and shifts the star-hold switch 256 to keep the relay 260 energized. It will also apply a potential across the timer 242 whereby the condenser will commence charging.

At the same time the star-hold switch 256 shifts, it will de-energize the fast-crawl relay 164 whereby the speedcontrol switch 162 CLOSES. This removes the resistance 158 from the field circuit and the crawler slows down. It will continue to run at the reduced speed until the timer 262 changes and deenergizes the X-ray-crawl relay 164 whereby switch 246 moves to the X-ray position and OPENS the forward-reverse switch 150 causing the crawler 10 to stop.

One side of the X-ray tube 28 is connected to one side 140 of the generator 106 by means of an X-ray-ON switch 264 controlled by the X-ray relay 266, a circuit-breaker switch 268 and the meter 270 on the control panel 138. The opposite side of the X-ray tube 28 is connected to a movable tap 272 on an auto-transfer 274 by means of a limiting resistor 276 and an X-ray surge control 278. The surge control 278 includes a resistor and a by-pass switch controlled by the relay coil 280 and time-delay circuit 282.

When the switch 246 moves into the X-ray position and the relay 226 is energized, it CLOSES the X-ray ON switch 264. At the same time it CLOSES switch 284 and starts the timer 282 for controlling the duration of the exposure.

The setting of the timer 282 is controlled by the knob 286 on the control panel 138. The position of the movable tap 272 on the auto-transformer 274 is controlled by adjusting the setting of the knob 288.

The second conductor in the pair 198 from sensor 98 is connected to the stop-relay coil 204. This coil is normally deenergized whereby the stop switch 202 remains CLOSED. However, when sensor 98 passes under an isotope marker, the coil releases the stop switch 202 whereby it OPENS. When this switch 202 OPENS, the holding coil 216 is de-energized and the ON-OFF switch 218 OPENS. This, of course, disables the control system whereby the crawler 10 will not move. However, this does not in any way alter the operation of the motor-generator set 100.

It should be noted that even if the isotope is removed and the coil 204 moves the stop switch 202 to the CLOSED position, the ON-OFF switch 218 will remain OPEN. Therefore, the crawler 10 will not restart. Instead, it will remain parked until the forward sensor 74 is CLOSED by an isotope marker. When this occurs the ON-OFF coil 216 is energized and the ON-OFF holding switch 218 is CLOSED.

Alternatively, an isotope marker may be placed over the sensor 126 on the third unit 26. When this occurs the reverse-relay coil 290 is energized and the reverse-hold switch 292 CLOSES and maintains the reverse switch 292 in the reverse position. It also energizes the ON-OFF relay 216 and CLOSES the ON-OFF switch 218 as well as energizing the run relay 152 and CLOSING run switch 148.

In order to utilize the present crawler 10 for inspecting the girth welds 18 between the sections of a pipeline 12, the crawler 10 is inserted into one end of the pipeline 12.

This is normally accomplished by first starting the gasoline engine and being sure it is running properly. Next, the first unit 22 is inserted through the end. Following this, the second and third units 24 and 26 are fed into the pipeline 12. As soon as the traction wheels 120 are inside of the pipeline 12, the motor 13 may be started by manually depressing the forward button 294 on the control panel 138. This starts the motor 30 to self-propel the crawler into the pipeline 12. This movement is allowed to progress until the crawler 10 has advanced up to the point where the control panel 130 is just accessible from the open end. The forward button 294 is then released and the crawler 10 stopped.

The various controls on the panel 138 can then be set to provide the desired mode of operation. The exposure required for X-raying the weld is determined in the usual manner, i.e., the relationship between the thickness of the pipe and weld, the sensitivity of the film, etc. Following this determination, the control knob 288 is adjusted to vary the anode voltage and current. The magnitude of the exposure is indicated by the meter 270. The timer 282 may then be set by adjusting knob 286 to select the duration of the exposure.

If it is desired to inspect each and every weld, the switch 296 is put in the AUTOMATIC position (shown position). Then the switch 144 may be placed in the ON position and the crawler 10 will start running.

Since each and every weld is to be inspected, the operator wraps a film belt around the outside of the welds 18 in advance of the passage of the crawler 10. As the crawler 10 propels itself down the pipeline 12, the star wheels 62 will slide along the inside surface of the pipe. When the crawler 10 reaches the girth weld 18, one or the other or both of the star wheels 62 will strike the material on the inside of the weld. When this occurs one or both of the star wheels 62 will turn over by at least one notch and thereby CLOSE the switch 254.

When this occurs the holding coil 260 is energized and the switch 256 moves to the position opposite from that shown. This immediately maintains coil 260 self-energized and deenergizes the winding 164 whereby the switch 162 moves to the CLOSED position and a large current flows through the field 156. This causes the speed of the motor 130 and the crawler 10 to be reduced. At the same time, the timer 262 is energized whereby the crawler 10 will continue to run at the reduced speed. The duration of the time interval is determined by the setting of the precision "pot" 226' as indicated at 252. This distance is selected to correspond to the time required for the crawler to travel a distance equal to the space from the star wheel 62 to the center of the X-ray anode. At the expiration of this time interval, the timer 242 will de-energize the winding 172, whereby the switches 170 and 246 will OPEN. This stops the motor 130 and energizes the brake relay 166. Since the speed of the crawler 10 has been reduced and it is traveling at a very slow speed, it will not skid, etc., when the brakes are applied. Instead, it will stop with the anode of the X-ray tube precisely centered within the girth weld and will hold in that position.

De-energizing the winding 172 will cause the switch to OPEN thereby disabling the sensors 72, 74, 98 and 126. Also, the switch 246 will move to the X-ray position disabling coils 154 to open switches 150 thereby stopping the motor 130, opening switch 170 to set the brakes and energizing the coils 226 and 280. This will CLOSE the switches 264 thereby energizing the X-ray tube 28, and the surge winding 280. When the interval for the timer 282 has run out, the surge winding 280 will be de-energized whereby the switch in the surge control 278 closes and effectively removes surge resistance.

When the winding 172 moves switch 246, it also moves switch 284 to start the exposure-control timer 283 and OPENS switch 238. When the time selected by the exposure-control timer 283 has expired, the switch 238 will return to the position shown. This will energize the winding 172 whereby the switch 170 will OPEN thereby releasing the brake, switch 298 will CLOSE thereby restoring the voltage to the sensors and switch 246 will return to the CRAWL position thereby re-energizing the forward windings 154. This will again CLOSE the forward switches 150 and start the motor 130 running. It has been found desirable to provide a slight delay by means of the delay circuit 300. With a delay of one second before starting the motor 130, the brake will fully release.

The initial starting is accomplished with the field 150 in the motor 130 whereby it will operate at a slow speed and provide a high torque. When the crawler 130 has started moving at the slow speed and the time for timer 262 has expired, the current-through relay 164 will be reduced whereby the switch 162 opens and crawler 10 immediately accelerates to top speed. It will continue on until the star wheels 62 trip over another weld and close switch 254.

It will be seen the foregoing sequence will automatically continue with the crawler 10 stopping at each and every weld. However, in the event there are no welds ready for inspection and the crawler is getting so close to the welders and/or the operator placing film belts around the welds so as to present radiation hazards, etc., it is desirable to stop the crawler 10. This is accomplished by leaving a marker such as a radioactive isotope on the outside of the pipeline 12. When the front sensors 72 and 74 pass under this isotope, the conductors in the pairs 194 and 196 will momentarily CLOSE.

This will not cause the motor 130 or crawler 10 to stop running. However, when the center sensor 198 passes under the isotope, the conductors in the pair 196 will close and energize the winding 204. This will immediately OPEN switch 202 whereby the crawler 10 immediately stops. As long as the isotope remains adjacent the center sensor 98, the switch 202 will be OPEN. When the isotope is removed the switch 202 will CLOSE. However, since the switch 218 is OPEN the entire control system is deenergized and the motor 130 will not run. It will be seen that once the crawler 10 has stopped, the isotope can be removed without the crawler starting up again. Accordingly, it may be left unattended, for example overnight, without any radiation hazards.

In the event it is desired to continue the inspection operation, the isotope may be positioned over the forward sensor 74. This will CLOSE the switch in the sensor to connect conductors 196 whereby the relay windings 152 and 226 will be energized thereby CLOSING and holding the ON-OFF switch 218 and the RUN switch 148. This will result in the motor 130 starting to run in the high-torque, low-speed mode until the timer 300 moves the switch 162 to the OPEN position. The crawler 10 will then proceed to run at high speed until the star wheel 62 trips over the next weld. The crawler will then stop, X-ray the weld and then proceed on to the next one.

In the event it is desired to discontinue the inspection operation and remove the crawler 10 from the pipeline, the isotope may be placed over the rear sensor 126 instead of the forward one. This will connect the conductors in the pair 200 whereby the switch 292 and 155 will move to reverse. Since the switches 150 are all held CLOSED by the relays 154, the motor will operate in reverse and continue to operate in reverse until the isotope is sensed by center or stop sensor or else the crawler 10 emerges from the end of the pipeline 12 that it originally entered.

Under some circumstances, it is desired to inspect only certain preselected welds. For example, the pipeline 12 may be fabricated from double sections, i.e., two sections are welded together prior to being delivered to the pipeline right-of-way. This means that only every other weld is made in the field and needs to be inspected. Also, under some circumstances only every second or third weld may be inspected, it being assumed that as long as these welds are free of defects the ones in between are also free of defects.

Under the foregoing circumstances, before the crawler 10 enters the pipeline, the switch 296 may be moved from the AUTOMATIC position to the SEMI-AUTOMATIC position. At the same time the switch 302 may be set in the SKIP position or in the SHOOT position. When switch 144 is CLOSED the crawler 10 will proceed to travel through the pipeline 12. If the switch 302 is in the SHOOT position and the sensor 72 does not pass beneath an isotope marker, the two switches 230 and 302 will be in series with the star switch 254 as shown. Accordingly, when one or both star wheels 62 trip over a weld, the switch 254 will CLOSE, and the crawler 10 will automatically stop and X-ray the weld as described above.

However, in the event an isotope is present when the sensor 72 passes the isotope, conductors in the pair 194 will be connected to energize the winding 206. This will hold the switch 214 CLOSED and start the timer 212. The switch 214 will remain CLOSED for the period set by the timer 212 and then it will OPEN. During this interval the switch 230 will be moved to the SKIP position (opposite from that shown). Thus, even though the star wheel 62 may CLOSE one or both of the switches 254, the relay winding 260 will not be energized and the crawler 10 will not stop. In addition, the switches will be CLOSED around the stop sensor 98 whereby the crawler 10 will not be stopped even though the isotope may cause this switch to OPEN.

It may thus be seen that when the switch 296 is in the SEMI-AUTOMATIC position and the switch 234 is in the SHOOT position, the crawler 10 will stop at each weld if there is not an isotope marker present and will travel right on passed any welds where an isotope marker is positioned.

The switch 234 may be in the SKIP position when the crawler is operating in the SEMI-AUTOMATIC mode. Under these circumstances the crawler 10 operates as before except in the converse. More particularly, when the isotope actuates the sensor 72 the switch 230 will be on the same side as the switch 302. As a consequence, if the star wheel closes switch 254, the crawler 10 will stop and X-ray the weld.

It will thus be seen the crawler will only stop on those welds where an isotope is present and will pass those welds where no isotope has been placed.

When the entire crawler has been inspected and the entire pipeline has been inspected, it will begin to emerge from the end. The first part that emerges is the forward guide wheel 66. As soon as the wheel 60 rolls over the end of the pipe, the arm 64 will swing upwardly and slide on the end. The switch 68 will then strike the pipe and immediately stop the entire crawler 10. It can be seen that this will keep the crawler 10 from running out of the pipeline 12 even though an operator may not be present. When the operator does arrive he can manually manipulate control switch 68 or one in parallel on the front of the crawler 10 so as to turn the motor 130 ON and drive the crawler 10 under its own power from the end of the pipeline.

If the circuit breaker is tripped as a result of an overload, the switches 258 and 268 OPEN. The crawler 10 will thus run all the way to the end of the pipeline without stopping and/or the X-ray tube being turned ON.

We claim:
1. The combination of
 a self-propelled crawler for traveling through a pipeline,
 inspection means on said crawler for inspecting welds in the pipeline,
 control means on said crawler for controlling the operation of the crawler and of the inspection means on the crawler, said control means being effective to sense a weld and actuate said inspection means to inspect the welds,
 a first pickup on said crawler responsive to the presence of a marker on the outside of the pipeline, said pickup being coupled to the control means and effective to STOP the crawler when a marker is present, and a second pickup on said crawler positioned in advance of the first pickup and responsive to the presence of the marker on the outside of the pipeline, said second pickup being coupled to the control means and effective to START the crawler in a forward direction when a marker is positioned thereover.

2. The combination of
a self-propelled crawler for traveling through a pipeline,
inspection means on said crawler for inspecting welds in the pipeline,
control means on said crawler for controlling the operation of the crawler and of the inspection means on the crawler, said control means being effective to sense a weld and actuate said inspection means to inspect the welds,
a pickup on said crawler responsive to the presence of a marker on the outside of the pipeline, said pickup being coupled to the control means and effective to STOP the crawler when a marker is present, and
a second pickup on said crawler positioned behind the first pickup and coupled to the control means, said second pickup being responsive to the presence of the marker on the outside of the pipeline and effective to START the crawler in a reverse direction when a marker is positioned thereover.

3. The combination of
a self-propelled crawler for traveling through a pipeline,
inspection means on said crawler for inspecting welds in the pipeline,
control means on said crawler for controlling the operation of the crawler and of the inspection means on the crawler, said control means being effective to sense a weld and actuate said inspection means to inspect the welds,
a first pickup on said crawler responsive to the presence of a marker on the outside of the pipeline, said pickup being coupled to the control means and effective to STOP the crawler when a marker is present,
a second pickup on said crawler positioned in advance of the first pickup and coupled to the control means, said second pickup being responsive to the presence of the marker on the outside of the pipeline to START the crawler in a forward direction when a marker is positioned thereover, and
a third pickup on said crawler positioned behind the first pickup and coupled to the control means, said third pickup being responsive to the presence of the marker on the outside of the pipeline and effective to START the crawler in a reverse direction when a marker is positioned thereover.

4. A crawler for traveling through a pipeline and inspecting welds in the pipeline, said crawler including the combination of
a tractor having an electric motor for driving the crawler through a pipeline, said electric motor having a low-speed mode of operation and a high-speed mode of operation,
inspection means on said crawler for moving through the pipeline, said inspection means being adapted to inspect the welds,
control means coupled to the motor and to the inspection means for controlling the operation thereof, said control means being effective to cause said motor to normally operate in said high-speed mode, and
pickup means adapted to sense when the crawler is approaching a weld in said pipeline and when the inspection means is aligned with said weld, said pickup means being coupled to the control means and effective to cause said motor to operate in the low-speed mode when the pickup means senses the crawler is approaching a weld, said control means being effective to STOP the crawler when the inspection means is aligned with the weld whereby the inspection means is positioned to inspect the weld.

5. The crawler of claim 4 wherein the inspection means includes an X-ray tube for irradiating the weld with X-rays.

6. In a device for traveling through a pipeline and inspecting welds therein, the combination of
a crawler for traveling through a pipeline,
a source of radiation on said crawler for irradiating the welds,
control means on the crawler for controlling the operation of the crawler and the source,
a first pickup on said crawler for sensing a weld in said pipeline,
a second pickup on said control means for sensing the position of a marker disposed outside of the pipeline, and
said pickups being coupled to said control means and effective to STOP the crawler and actuate said source of radiation when the first pickup senses a weld and the second pickup senses the marker.

7. In a device for traveling through a pipeline and inspecting welds therein, the combination of
a crawler for traveling through a pipeline,
a source of radiation on said crawler for irradiating the welds in the pipeline,
control means on the crawler for controlling the operation of the crawler and the source,
a first pickup on said crawler for sensing a weld in said pipeline,
a second pickup for sensing the position of a marker disposed outside of the pipeline, and
said first and second pickups being coupled to the control means and effective to allow the crawler to only STOP at those welds where a marker is not present.

8. A pipeline crawler for traveling through a pipe and radiographically inspecting the circumferential welds between the ends of successive sections of the pipe, said crawler including the combination of
a source of radiation for irradiating said weld and exposing a film on the outside of the pipe,
a tractor coupled to said source for propelling the source through the pipe,
a first pickup carried with said crawler for sensing the position of a weld,
a second pickup carried with said crawler for sensing a marker positioned on the outside of said pipe,
control means coupled to the first and second pickups as well as to said tractor and source of radiation for controlling the operation thereof, and
means for placing said control means in a first mode whereby the tractor will STOP at a weld sensed by the first pickup provided the second pickup does not sense a marker and for placing in a second mode whereby the tractor will STOP at the weld sensed by the first pickup provided the second pickup does sense a marker.

9. A pipeline crawler for traveling through a pipe and radiographically inspecting the circumferential welds between the ends of successive sections of the pipe, said crawler including the combination of
  a source of radiation for irradiating said weld and exposing a film on the outside of the pipe and at least partially surrounding the weld,
  a tractor coupled to said source for propelling it through the pipe,
  control means coupled to the tractor and to said source for controlling the operation thereof, said control means having a SHOOT mode wherein the tractor STOPS the crawler with the source aligned with the weld and a SKIP mode wherein the tractor does not STOP at a weld,
  a first pickup on said crawler for sensing the position of a weld, said first pickup being coupled to said control means effective to actuate said source of radiation for irradiating said weld when the crawler STOPS at a weld, and
  a second pickup on said crawler for sensing a marker positioned on the outside of said pipeline, said second pickup being coupled to the control means and effective to cause said control means to STOP the crawler when the control means is in the SHOOT mode.

10. A pipeline crawler for traveling through a pipe and radiographically inspecting the circumferential welds between the ends of successive sections of the pipe, said pipeline crawler including the combination of
  an inspection section,
  a tractor section,
  a power supply section,
  an X-ray machine on said inspection section for irradiating said welds with X-rays and exposing a film on the outside of the pipe and at least partially surrounding the weld,
  an electric motor on the tractor for propelling the crawler through the pipeline,
  a motor generator on the power supply section for generating electricity for operating the electric motor and the X-ray machine,
  control means coupled to the power supply, the electric motor and to said X-ray machine for controlling the operation thereof,
  a STOP pickup carried on said crawler for sensing a marker positioned on the outside of the pipeline, said STOP pickup being coupled to said control means and effective to STOP said tractor,
  a FORWARD pickup carried on said crawler for sensing the marker positioned on the outside of said pipeline, said FORWARD pickup being positioned in advance of the STOP pickup so as to move passed the marker before the STOP pickup, said FORWARD pickup being coupled to said control means and effective to start said electric motor for driving the crawler in the forward direction,
  a REVERSE pickup carried on said crawler behind the STOP pickup whereby the REVERSE pickup moves passed the marker before the STOP pickup when the crawler is traveling in the REVERSE direction, said REVERSE pickup being coupled to the control means and effective to start said electric motor for driving the crawler in the REVERSE direction.

11. The pipeline crawler of claim 10 including a CONTROL pickup effective to sense the marker on the outside of the pipeline, said CONTROl pickup being coupled to the control means and effective to cause the crawler to STOP and X-ray or not STOP when a marker is present.

12. The pipeline crawler of claim 11 including a pickup to sense the end of the pipeline and STOP the crawler when it emerges from the pipeline.

13. The pipeline crawler of claim 12 wherein the electric motor has a high-torque, slow-speed mode or a low-torque, high-speed mode, and
  the STOP pickup is effective to cause the control means to switch the motor to the high-torque, low-speed mode before it STOPS.

* * * * *